United States Patent
Basu et al.

(10) Patent No.: US 6,366,885 B1
(45) Date of Patent: Apr. 2, 2002

(54) SPEECH DRIVEN LIP SYNTHESIS USING VISEME BASED HIDDEN MARKOV MODELS

(75) Inventors: Sankar Basu, Tenafly, NJ (US); Tanveer Atzal Faruquie, Munirka (IN); Chalapathy V. Neti, Yorktown Heights, NY (US); Nitendra Rajput, New Delhi (IN); Andrew William Senior, New York, NY (US); L. Venkata Subramaniam; Ashish Verma, both of New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/384,763

(22) Filed: Aug. 27, 1999

(51) Int. Cl.[7] .................. G10L 21/06; G10L 15/14; G11B 27/00
(52) U.S. Cl. .............. 704/270; 704/235; 704/258
(58) Field of Search .................. 704/270, 258, 704/235; 348/345, 576; 345/473; 352/87; 707/500.1

(56) References Cited

U.S. PATENT DOCUMENTS

| | | | | |
|---|---|---|---|---|
| 5,657,426 A | * | 8/1997 | Waters et al. | 704/270 |
| 5,880,788 A | * | 3/1999 | Bregler | 704/235 |
| 5,884,267 A | * | 3/1999 | Goldenthal et al. | 704/270 |
| 6,052,132 A | * | 4/2000 | Christian et al. | 345/474 |
| 6,208,356 B1 | * | 3/2001 | Breen et al. | 345/474 |

OTHER PUBLICATIONS

Chen et al ("Audio–Visual Integration in Multimodal Communication," IEEE Proceedings vol. 86 No. 5, May 1998).*
Goldschen et al ("Rationale for Phoneme–Viseme Mapping and Feature Selection in Visual Speech Recognition", Aug. 28–Sep. 8, 1995).*

* cited by examiner

*Primary Examiner*—Richemond Dorvil
*Assistant Examiner*—Daniel A. Nolan
(74) *Attorney, Agent, or Firm*—Whitman, Curtis & Christofferson, P.C.; Stephen C. Kaufman

(57) ABSTRACT

A method of speech driven lip synthesis which applies viseme based training models to units of visual speech. The audio data is grouped into a smaller number of visually distinct visemes rather than the larger number of phonemes. These visemes then form the basis for a Hidden Markov Model (HMM) state sequence or the output nodes of a neural network. During the training phase, audio and visual features are extracted from input speech, which is then aligned according to the apparent viseme sequence with the corresponding audio features being used to calculate the HMM state output probabilities or the output of the neutral network. During the synthesis phase, the acoustic input is aligned with the most likely viseme HMM sequence (in the case of an HMM based model) or with the nodes of the network (in the case of a neural network based system), which is then used for animation.

16 Claims, 5 Drawing Sheets

SPEECH DRIVEN LIP SYNTHESIS USING VISEME BASED HIDDEN MARKOV MODELS

BACKGROUND OF THE INVENTION

1. Field of the Invention

The present invention generally relates to speech driven lip synthesis, and more particularly to the use of Hidden Markov Models (HMMs) to animate lip movements from acoustic speech.

2. Background Description

Visual speech synthesis has become an area of interest due to its possible application in such areas as a) solving bandwidth problems where audio is available but little or no video is available, e.g. videoless uplinking, b) movie dubbing, c) synthetic video conferencing, d) language learning using three dimensional animation of articulators, and e) distance learning.

Researchers in the prior art have applied an approach to solve this problem which assumes that speech is a linguistic entity made of small units of acoustic speech or "phonemes". Speech is first segmented into a sequence of phonemes, and then each phoneme is mapped to a corresponding unit of visual speech (generally a distinct lip shape) or "viseme". This approach has been applied using a variety of methods, in particular vector quantization, direct estimation, and the Hidden Markov Model (HMM).

Vector Quantization Methods

In this approach, the acoustic parameters—for example cepstral coefficient vectors—are divided into a number of classes using vector quantization. For each acoustic class, the corresponding visual code words are averaged to produce a visual centroid. Each acoustic vector would be classified during the optimal acoustic vector quantizer, then mapped to the corresponding visual centroid. The drawback of this approach is that, because of the distinct output levels, it produces a staircase-like output rather than a smooth output.

Direct Estimation

In this approach, the best estimate of the visual parameters is derived directly from the joint statistics of the audio and visual parameters. Let $f_{av}(a,v)$ denote the joint distribution of the feature vector $[a^T, v^T]^T$ comprising the acoustic features and the visual parameters. If we know the joint probability density function (pdf) $f_{av}(a,v)$, then the optimal estimate of $v$ for a given $a$ is calculated as follows:

$$E\langle v/a \rangle = \int v \frac{f_{av}(a,v)}{f_a(a)} dv$$

HMM Based Approach

HMMs have been used in speech recognition for a long time, as described by Frederick Jelinek in *Statistical Methods for Speech Recognition* (MIT Press, 1998). Its use in lip synthesis has also been proposed by several researchers. The main idea behind using the HMM for lip synthesis is to define a mapping between the HMM states and image parameters. See T. Chen and Ram R. Rao, "Audio-Visual Integration in Multimodal Communication" in *Proceedings of the IEEE*, May 1998. HMMs represent phonemes, but during the training phase an association is developed between the HMM states and the visual features. The training speech database is aligned into an HMM state sequence using Viterbi alignment. For a given HMM state, the visual features of the corresponding frames are averaged and assigned to the state. During the synthesis phase, the input speech is aligned to the HMM state sequence by the Viterbi alignment. The image parameters associated with HMM states are retrieved during the Viterbi alignment and then this sequence of image parameters is animated. See Eli Yamamoto, Satoshi Nakamura and Kiyohiro Shikano, "Lip Movement Synthesis from Speech Based on Hidden Markov Models," AVSP, 1997.

There are several problems with this approach. Because the number of distinguishable lip shapes are less than the number of phonemes there is some redundancy involved when using phoneme based HMMs for the synthesis. For example, during the alignment phase a computation for most likelihood is performed for each possible succeeding phoneme or phoneme sequence, which may not be necessary. Also, one cannot make use of context-dependency in the visual domain during alignment of phoneme based HMMs. Further, if phonemes which are visually different but acoustically similar are confused in the synthesis phase they will produce out of sequence visemes during the animation.

The advantages of first segmenting speech into a sequence of phonemes and then mapping each phoneme to a corresponding viseme, using any of the above implementation methods, are as follows:

1) the acoustic speech signal is explored fully so that all the context information is utilized and co-articulations (i.e. the change in the utterance of a sound by preceding and/or succeeding sound in a given sound sequence) are completely incorporated in the speech recognition model for recognizing phonemes, which are then mapped to corresponding visemes for visual speech synthesis, and 2) it provides the most precise speech analysis.

However, this approach has a number of disadvantages. First, one needs to recognize the spoken words or sentences and a phoneme to viseme mapping is required. This involves an unnecessary additional computational overhead because it is not really necessary to recognize the spoken words or sentences in order to synthesize lip movements. Second, alignment errors that occur during acoustic alignment of the speech signal can cause discontinuity in the synthesized visual sequence. For example, the acoustically similar nasal tones "m" and "n" can cause discontinuity based on phoneme confusion even though they are visually distinct. Third, more training data is required to train a speech recognizer based on phones since the number of phones (greater than fifty) is greater than the number of visemes.

SUMMARY OF THE INVENTION

It is therefore an object of the present invention to provide a model for lip synthesis based directly on the visemes.

A further object of the invention is to reduce the time required to find the most likely viseme sequence in lip synthesis systems.

Another object of the invention is to enable use of visual domain context dependency in determining the most likely viseme sequence.

It is also an object of the invention to reduce the size of training data required to train a system for lip synthesis.

The approach implemented by the present invention considers speech as a physical phenomenon and assumes that there is a functional relationship between the speech parameters and the visual parameters. So in this case the goal is to find the best functional approximation given sets of training data. This can be achieved using the implementation methods of vector quantization, neural networks, and the Hidden Markov Model(HMM) with Gaussian Mixtures. This approach considers only the relationship between the audio signal and the lip shapes rather than what was actually spoken. This method needs only the relationship between the speech parameters and visual parameters for visual speech synthesis, and therefore requires less computational overhead than the prior art methods. So in the approach taken by the invention the recognition of spoken words or sentences need not be performed at all.

Earlier approaches solved the problem of lip synthesis by first recognizing the speech using phoneme based HMMs and then converting these phonemes into corresponding lip shapes (visemes). The present approach uses viseme based training systems instead of using phoneme based training systems. In this approach it is not necessary to differentiate among those phonemes which look similar visually. Since the number of visemes is much less than the number of phonemes, the dimensionality of the space in which the system works is reduced. This results in reduced requirements for computation and training data.

The method of the invention synthesizes lip movements from speech acoustics by first grouping phonemes into a sequence of distinct visemes, and then applying this correspondence to new audio data to generate an output viseme sequence. The grouping can be accomplished by generating visemes from video data and then grouping audio data according to each viseme. The grouping can also be accomplished by generating phonemes from audio data and creating a mapping of phonemes to visemes.

In the HMM implementation (which can be used with each grouping methodology), HMM state probabilities are generated from input speech which has been aligned according to the viseme sequence. These HMM state probabilities are applied to acoustic speech input, aligning the input with a most likely viseme HMM state sequence, which is then used to animate lip movements. In the neural network implementation a neural network is trained to recognize a correspondence between visemes and the underlying audio data, and then the network is used to produce viseme output from new audio input.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
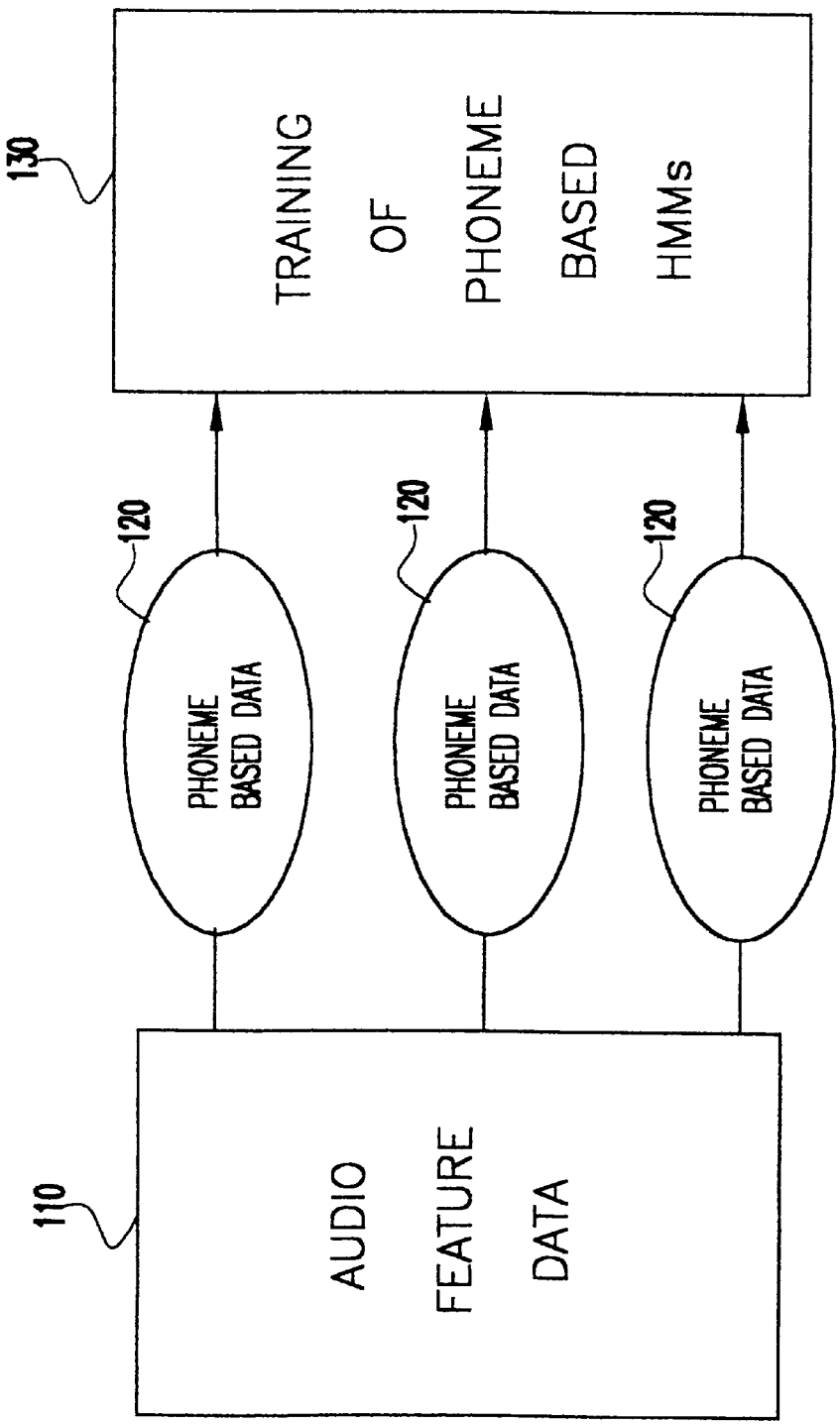
FIG. 1 is a block diagram showing the prior art scheme used to train phoneme based HMMs.

Referring now to the drawings, and more particularly to FIG. 1, there is shown the prior art scheme used to construct phoneme based data 120 from audio feature data 110, and then use the phoneme based data to train phoneme based HMMs 130. Audio feature data 110 is classified based on the phonemes, and then individual phoneme HMMs are trained with the data corresponding to that phone.

Figure 2:
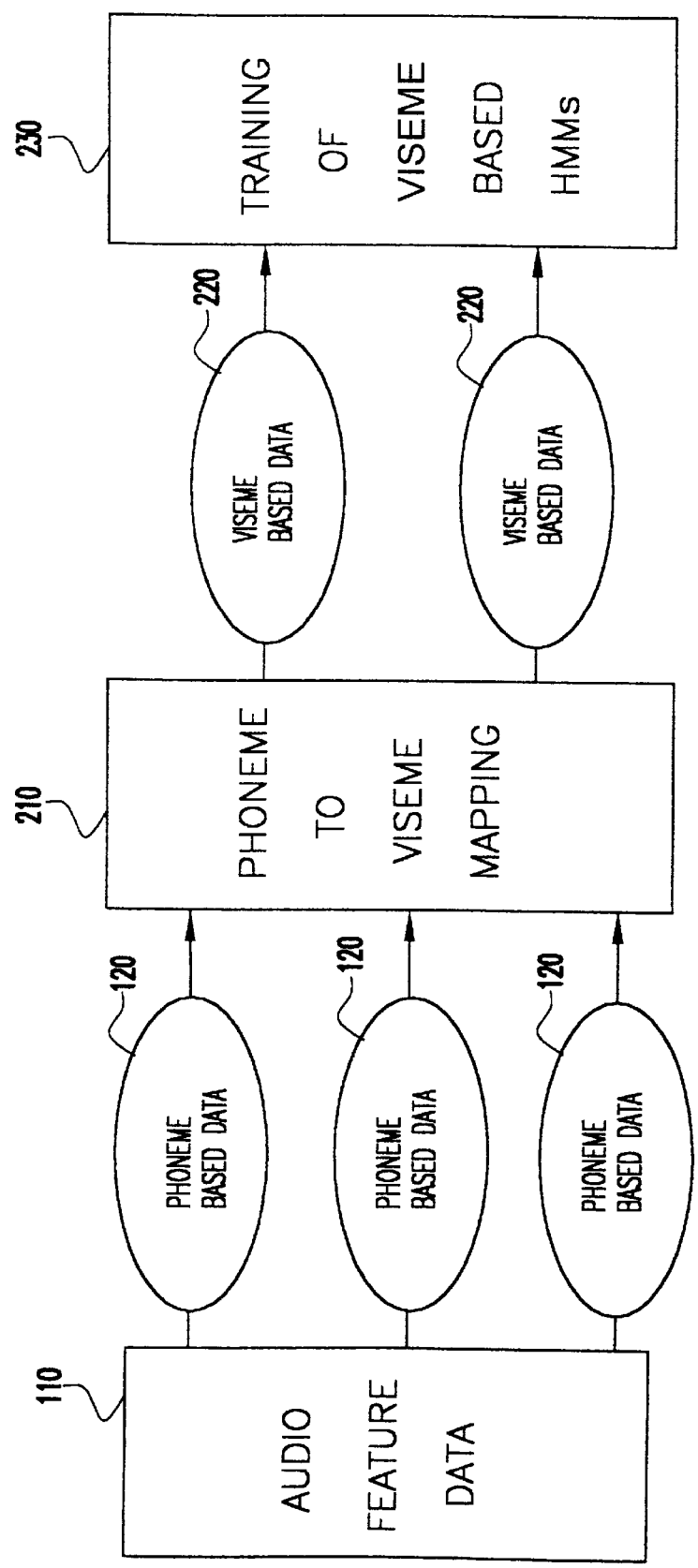
FIG. 2 is a block diagram showing the training of viseme based HMMs in accordance with the present invention.

The approach taken by the present invention is to synthesize the lip movement from the acoustic speech, as shown in FIG. 2. This approach assumes that there is a physical relationship between the audio signal and the corresponding lip shapes, which enables phoneme to viseme mapping 210. So we do not need to recognize what the speaker is actually saying; we just need to know how the lips move with the variation in the audio features. We use this relationship between the audio features and the visual features to generate audio visual mapping 220 and viseme based HMMs 230 instead of phoneme based HMMs for visual speech synthesis. The HMMs represent visemes and the output generated by the HMM states are the acoustic features of the speech.

The number of HMMs in the system is equal to the number of visemes (typically ten to twelve). An example of the phoneme to viseme mapping is given by the following table:

TABLE 1

| f, v   | p, b, m          | I    |
|--------|------------------|------|
| th, dh | w                | i, y |
| s, z   | r                | ah   |
| sh, zh | d, g, k, n, t, y | eh   |

In the above table, phones \p\, \b\ and \m\ are merged into a single group as all of them result in similar lip shapes. There will only be one HMM modeled for this group in the system while in the earlier approaches there were three HMMs for the three phonemes. During recognition, when the input acoustic speech is aligned with the corresponding HMMs, we have a lower number of possible HMM sequences as compared to earlier approaches. This results in reduced computation in the alignment procedure. For example, if we have twenty-five visemes in the system, the number of possible HMM sequences for a three sequence HMM model is $(25)^3=15625$ as compared to $(52)^3=140608$ for a fifty-two phoneme system.

Figure 3:
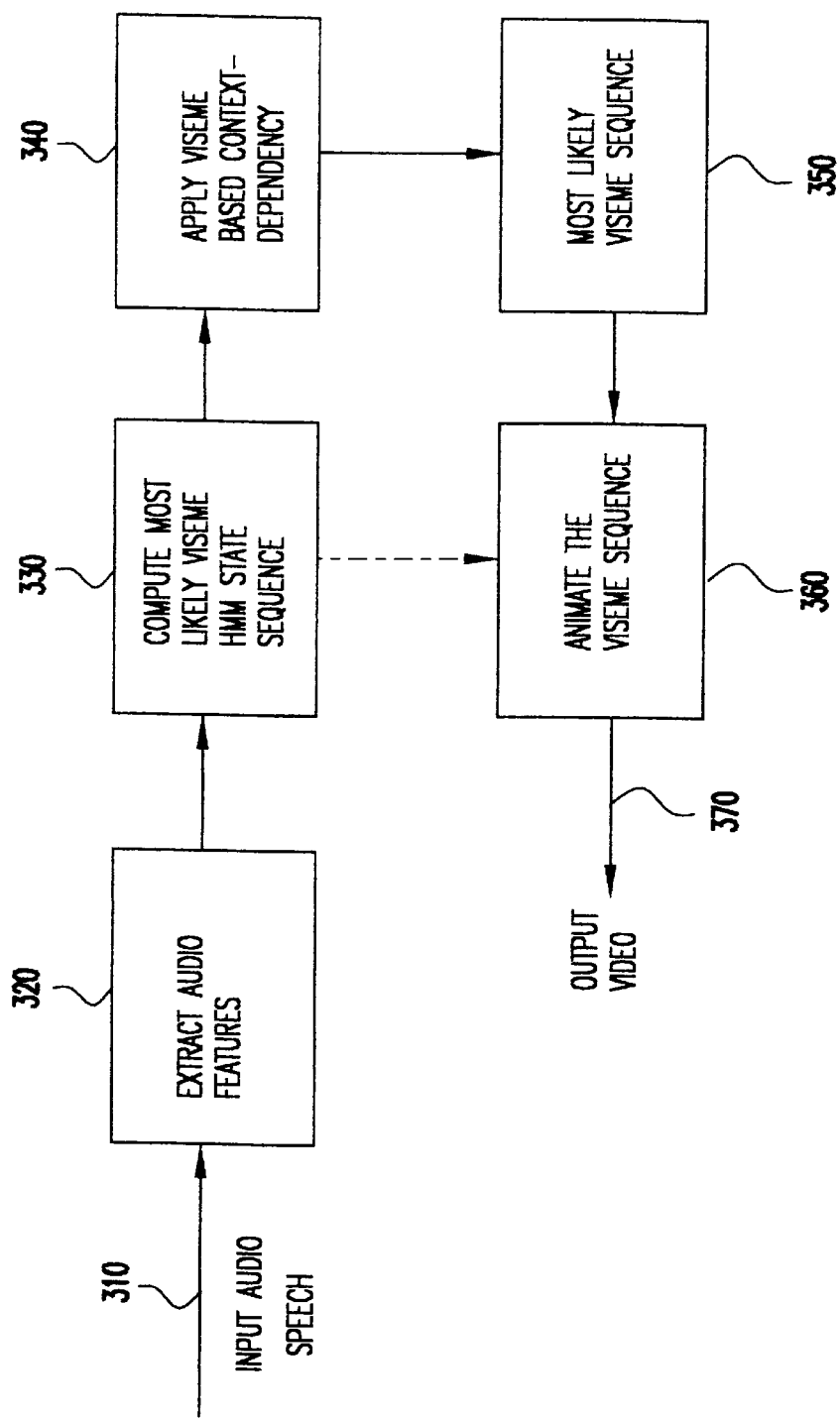
FIG. 3 is a flow chart showing how lip movements are synthesized from speech.

Each HMM is trained by the corresponding audio features, as shown in FIG. 2, viz. Mel-cepstral coefficients of all the phonemes in the viseme group. Since we are not differentiating among phonemes in a single viseme group, we require less data to model this single HMM as compared to modeling several HMMs, one for each phoneme in the group. During the training phase, audio and visual features are extracted from input speech. The audio features 320 (cepstral coefficients) are extracted from the input audio speech 310 and then aligned according to the viseme sequence appearing in it. For a given HMM state, the corresponding audio features are used to calculate the output probability distributions for the given state. During the synthesis phase 330, the input acoustic speech is aligned with the most likely viseme HMM state sequence. This HMM sequence can be used directly for the animation 360, as shown by the dashed arrow going from block 330 to block 360 in FIG. 3, or after smoothing (not shown) has been performed in order to eliminate jerks and abrupt discontinuities that may occur in the animated video sequence 370 that is generated by the HMM.

Since the number of HMMs in the system are small (equal to the number of visemes), the time required to find the most likely state sequence is substantially reduced. In real time applications, this is a great advantage. Also, context dependency based on visemes 340 can be used in determining the most likely HMM state sequence 350, which is not possible with phoneme based HMMs. Viseme based context-dependency is more relevant in the synthesis context.

Finally, the amount of data required to train the HMMs is reduced for viseme based HMMs. This is due to the fact that in earlier approaches data was required to differentiate between those phonemes which were acoustically similar. But under the present invention there is no need to differentiate between phonemes which are also visually similar. For example, \f\ and \v\ are similar both acoustically and visually. In accordance with the invention, since the HMMs are viseme based and not phoneme based, we do not need to differentiate between such levels. Other examples of such groups are {'\p\', '\b\'} and {'\t\', '\d\'}.

Figure 4:
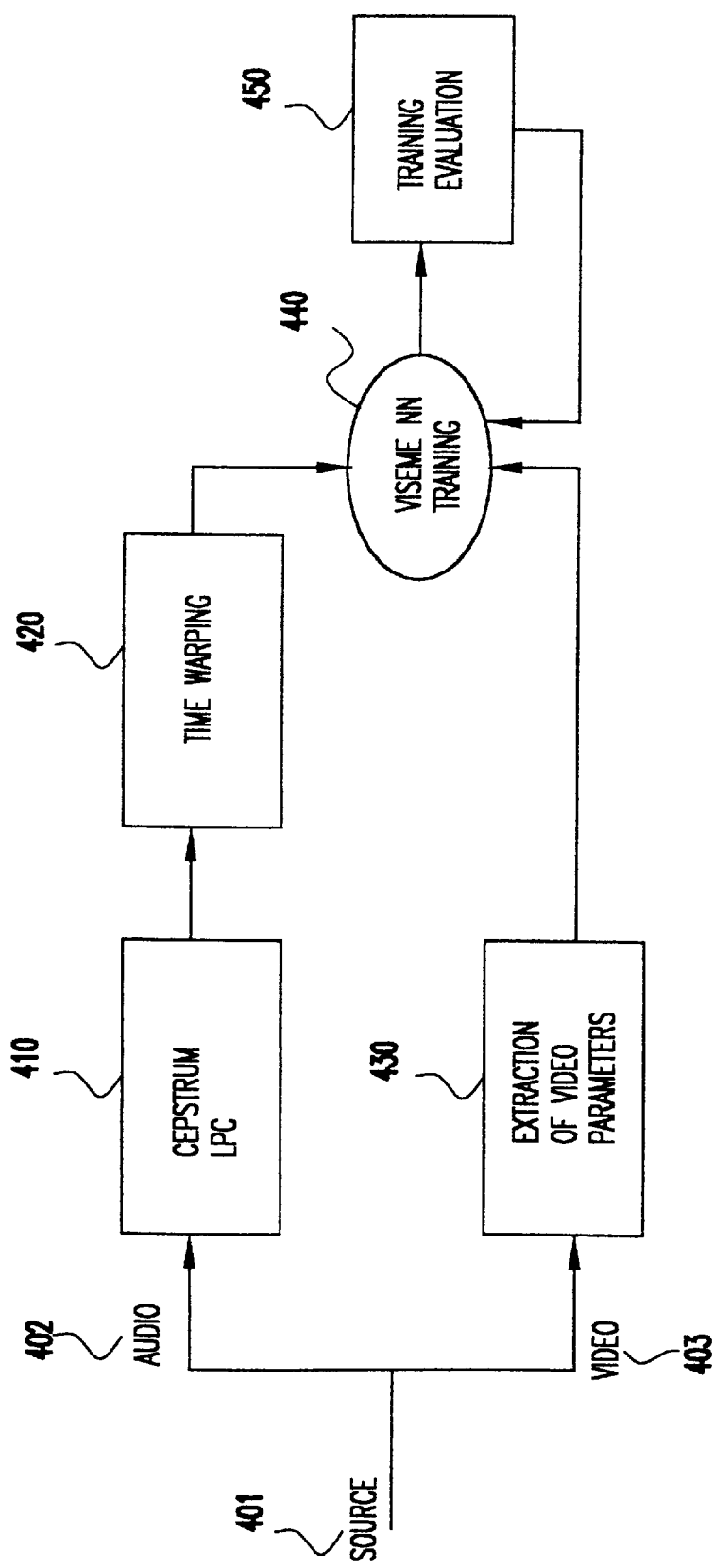
FIG. 4 is a block diagram/flow chart showing the training of viseme based neural networks.

The invention can also be used with other techniques, as will now be shown with respect to neural networks. The training of a neural network based system for synthesizing video from speech involves the steps indicated in FIG. 4. First, the source 401 is separated into audio 402 and video 403 streams. A cepstral analysis is performed 410 on the audio data 402, which is then time warped dynamically 420 to remove the inconsistencies in the LPC coefficients due to the speed of the spoken words. Video parameters are extracted 430 from the video data. The results from both the audio and the video streams are then fed into the neural network 440 as input for learning. Based on this input, the neural network 440 adjusts its weights in a training evaluation cycle 450.

Figure 5:
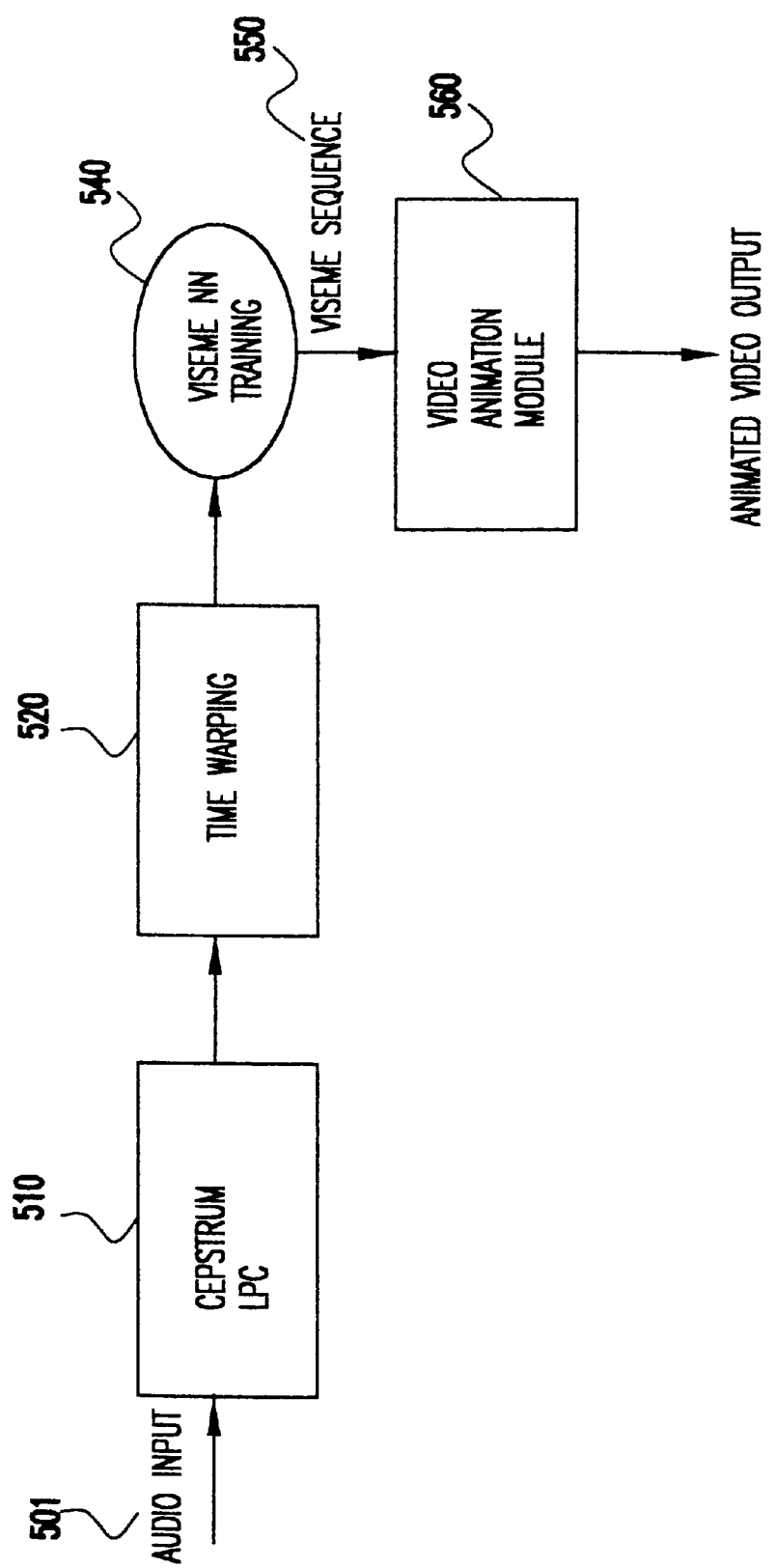
FIG. 5 is a block diagram/flow chart showing lip synthesis using viseme based neural networks.

Once trained, such a neural network based system gives a representation of the video parameters to be presented from a given audio sequence. Such a trained system can then be used to synthesize the video from a given audio input, as will be shown with reference to FIG. 5. The input to the trained neural network 540 are the same cepstral coefficients which are recognized from cepstral analysis 510 and after dynamic time warping 520. This generates a phoneme sequence corresponding to the audio input 501, and this is fed into the viseme neural network 540. Viseme neural network 540 will, however, give a corresponding viseme sequence 550 as the output into video animation module 560, taking into account the mapping from phonemes to visemes learned in the training phase. It is to be noted that the phonemes are still recognized in the training system.

In prior implementations using Neural Networks an approach for animating the lip parameters from input audio speech is found wherein a Time-Delay Neural Network is used to map the audio domain vector to a vector in the visual domain. This visual domain vector represents the mouth articulatory parameters. However, it does not give an output in terms of the different visemes corresponding to the input audio unit. See Fabio Lavagetto, "Time-Delay Neural Networks for Estimating Lip Movements from Speech Analysis: A Useful Tool in Audio-Video Synchronization," *IEEE Transactions on Circuit and Systems for Video Technology*, October 1997.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of synthesizing lip movements from speech acoustics, comprising the steps of:
   developing a direct correspondence between audio data and distinct visemes;
   applying said correspondence to new audio data and generating an output viseme sequence corresponding to said new audio data.

2. The computer implemented method of claim 1, wherein said developing step further comprises the steps of:
   generating visemes from video data; and
   grouping audio data corresponding to each said viseme.

3. The computer implemented method of claim 2, wherein said developing step further comprises the steps of:
   generating Hidden Markov Model (HMM) state probabilities using said developed correspondence between audio data and said distinct visemes; and
   applying said HMM state probabilities to an acoustic speech input, thereby aligning said acoustic speech input with a most likely viseme HMM state sequence.

4. The computer implemented method of claim 3, further comprising the steps of:
   using context dependency information in a visual domain; and
   smoothing said most likely viseme HMM state sequence.

5. The computer implemented method of claim 1, wherein said developing step further comprises the step of creating a mapping of said audio data to corresponding visemes.

6. The computer implemented method of claim 6, wherein said developing step further comprises the steps of:
   generating Hidden Markov (HMM) state probabilities using said developed correspondence between audio data and said distinct visemes; and
   applying said HMM state probabilities to an acoustic speech input, thereby aligning said acoustic speech input with a most likely viseme HMM state sequence.

7. The computer implemented method of claim 6, further comprising the steps of:
   using context dependency information in a visual domain; and
   smoothing said most likely viseme HMM state sequence.

8. The computer implemented method of claim 1, wherein said developing step further comprises the steps of:
   training a viseme based neutral network using said developed correspondence between said audio data said distinct visemes; and
   using said neutral network to produce a viseme output from new audio data input.

9. A device for synthesizing lip movements from speech acoustics, comprising:
   means for developing a direct correspondence between audio data and distinct visemes;
   means for applying said correspondence to new audio data and generating an output viseme sequence corresponding to said new audio data.

10. The device of claim 9, wherein said developing means further comprises:
    means for generating visemes from video data; and
    means for grouping audio data corresponding to each said viseme.

11. The device of claim 10, wherein said developing means further comprises:
    means for generating Hidden Markov Model (HMM) state probabilities using said developed correspondence between audio data and distinct visemes; and
    means for applying said HMM state probabilities to an acoustic speech input, thereby aligning said acoustic speech input with a most likely viseme HMM state sequence.

12. The device of claim 11, further comprising:
    means for using context dependency information in a visual domain; and means for smoothing said most likely viseme HMM state sequence.

13. The device of claim 9, wherein said developing means further comprises means for creating a mapping of said audio data to corresponding visemes.

14. The device of claim 13, wherein said developing means further comprises:
- means for generating Hidden Markov Model (HMM) state probabilities using said developed correspondence between audio data and distinct visemes; and
- means for applying said HMM state probabilities to an acoustic speech input, thereby aligning said acoustic speech input with a most likely viseme HMM state sequence.

15. The device of claim 14, further comprising:
- means for using context dependency information in a visual domain, and
- means for smoothing said likely viseme HMM state sequence.

16. The device of claim 9, wherein said developing means further comprises:
- means for training a viseme based neutral network using said developed correspondence between said audio data and said distinct visemes; and
- means for using said neutral network to produce a viseme output from new audio data input.

* * * * *